United States Patent [19]

Granger

[11] Patent Number: 5,189,797
[45] Date of Patent: Mar. 2, 1993

[54] APPARATUS FOR MEASURING THE SHAPE OR POSITION OF AN OBJECT

[75] Inventor: Romain Granger, Montoire, France

[73] Assignee: Romer, Montoire, France

[21] Appl. No.: 845,702

[22] Filed: Mar. 4, 1992

[30] Foreign Application Priority Data

Mar. 12, 1991 [FR] France .................. 91 02976

[51] Int. Cl.⁵ .................................. G01B 5/14
[52] U.S. Cl. ................................. 33/1 MP
[58] Field of Search .......... 33/1 MP, 1 PT, 1 N, 33/503; 901/10, 15, 48-50

[56] References Cited

U.S. PATENT DOCUMENTS 4,343,092 10/1982 Wahl .
4,606,696 8/1986 Slocum ............. 33/1 PT X

FOREIGN PATENT DOCUMENTS 0078113 1/1982 European Pat. Off. .
0237698 8/1983 European Pat. Off. .
3730873 9/1987 Fed. Rep. of Germany .
1498009 6/1974 United Kingdom .

Primary Examiner—Harry N. Haroian
Attorney, Agent, or Firm—Griffin Butler Whisenhunt & Kurtossy

[57] ABSTRACT

The measurement apparatus comprises a stand supporting a series of measurement segments hinged to one another and having angular position sensors for sensing the angular positions of the measurement segments, a series of hinged support segments adjacent to the measurement segments, link members fixed to the support segments and engaged at least partially around the measurement segments to support them in a direction opposing the force of gravity, and assistance members acting on the support members to counter the force of gravity.

3 Claims, 1 Drawing Sheet

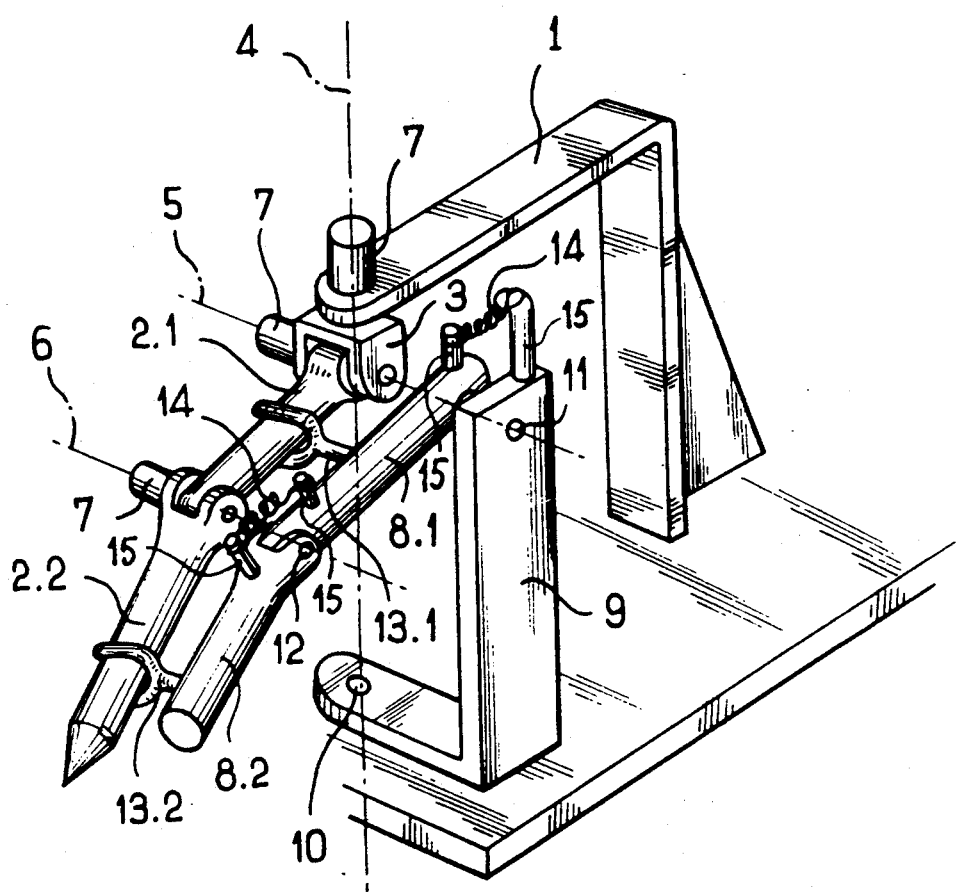

APPARATUS FOR MEASURING THE SHAPE OR POSITION OF AN OBJECT

The present invention relates to apparatus for measuring the shape or position of an object.

BACKGROUND OF THE INVENTION

Devices are known for measuring the shape or position of an object that comprise a stand supporting a series of hinged-together measurement segments and angular position sensors for sensing the angular positions of the measurement segments. To manipulate the measurement apparatus, it is necessary to support the measurement segments so as to bring the end of the last measurement segment into contact with a point whose position is to be determined, either relative to a reference surface, or else relative to some other point against which the end of the last measurement segment is brought subsequently, with the relative position of these points being computed by a processor unit as a function of the information given by the angular position sensors when contact is being made with the end of the last measurement segment.

At present, the measurement segments are supported either manually or else by means of motors associated with the measurement segments. Supporting the measurement segments manually tires the user and limits the capacity of the user to manipulate the apparatus. In particular, when the measurement segments are of large dimensions, e.g. for measuring the positions of points that are a long way apart, it can become impossible for the measurement apparatus to be manipulated by a single user.

To avoid this drawback, proposals have been made to motorize the measurement segments, i.e. to place not only angular position sensors at the hinges, but also to place assistance members such as drive motors for driving the measurement segments relative to one another, or more simply to provide springs at the hinges between the measurement segments or to provide cables associated with the measurement segments and connected to counterweights to balance the gravity forces to which the measurement segments are subjected. Documents GB-A-1 498 009 and EP-A-0 237 698 illustrate such solutions. Regardless of the assistance means used, the hinges between the measurement segments are subjected to a reaction force which opposes the force of gravity to which the measurements segments are subjected. These gravity and reaction forces can give rise to hinge wear, or merely to deformation, in particular because of segment bending, thereby disturbing the measurement performed by the position sensors such that these apparatuses cannot be used for very high accuracy measurements, e.g. measurements where it is desired to determine the position of a point to within one micron.

The state of the art also includes hinged-arm robot structures (see, for example, Documents EP-A-0 078 113 and DE-A-3 730 873). Finally, Document U.S. Pat. No. 4,343,092 illustrates a universal joint mount for a measurement apparatus, with the apparatus being supported thereby, thereby increasing the forces at the hinges.

An object of the present invention is to provide very high accuracy measurement apparatus capable of being used without tiring a user.

SUMMARY OF THE INVENTION

To achieve this object, the present invention provides an apparatus for measuring the shape or position of an object, the apparatus comprising a stand supporting a series of measurement segments hinged to one another and having angular position sensors for sensing the angular positions of the measurement segments, wherein the apparatus further includes a series of hinged support segments adjacent to the measurement segments, link members fixed to the support segments and engaged at least partially around the measurement segments to support them in a direction opposing the force of gravity, and assistance members acting on the support members to counter the force of gravity.

As a result, the reaction forces opposing the force of gravity are transferred to the hinges of the support segments such that the forces on the hinges between the measurement segments are considerably reduced and do not give rise to disturbances in the desired accuracy range for determining the angular positions of the measurement segments.

In an advantageous version of the invention, the support segments are hinged about hinge axes that are colinear with the hinge axes of the measurement segments. Thus, the movements of the support segments are exactly identical to the movements of the measurement segments, and this reduces the forces to which the hinge axes of the measurement segments are subjected.

BRIEF DESCRIPTION OF THE DRAWING

An embodiment of the invention is described by way of example with reference to the accompanying drawing, in which the sole FIGURE is a perspective view of a preferred embodiment of the invention.

DETAILED DESCRIPTION

With reference to the FIGURE, the measurement apparatus of the invention comprises a stand 1 in the form of a bracket fixed on a base plate. A first measurement segment given an overall reference 2 (and more specifically identified by the reference 2.1) is hinged to the stand 1 via a clevis 3 mounted to pivot about a vertical hinge axis 4. The measurement segment 2.1 is mounted in the clevis 3 to pivot about a horizontal axis 5. A second measurement segment 2.2 is hinged about a horizontal hinge axis 6 at an end of measurement segment 2.1 that is opposite to its end hinged to the clevis 3. The angular positions of the measurement segments relative to each other and relative to the stand 1 are measured by angular position sensors 7 that are appropriately connected to a processor unit (not shown).

According to the invention, the measurement apparatus also includes support segments 8.1 and 8.2 respectively adjacent to measurement segments 2.1 and 2.2. The support segments 8 are carried by an L-shaped bracket 9 having a first end hinged to the base plate about a hinge axis 10 that is colinear with the hinge axis 4 of the clevis 3, and having a second end carrying a hinge axis 11 on which the first support segment 8.1 is mounted. The hinge axis 11 is colinear with the hinge axis 5 between the clevis 3 and the first measurement segment 2.1. The second support segment 8.2 is hinged to the first support segment 8.1 about a hinge axis 12 which is colinear with the hinge axis 6 between the second measurement segment 2.2 and the first measurement segment 2.1. Link members, constituted in this case by forks 13 respectively numbered 13.1, 13.2 are fixed to the support members and are engaged around the measurement segments to support them in a direction that opposes the force of gravity as exerted on the measurement segments.

In addition, springs 14 have their ends fixed to pegs 15 firstly secured to the bracket 9 and to the first support segment 8.1, and secondly secured to the first support segment and to the second support segment. The springs 14 constitute assistance members acting on the support segments against the force of gravity. Because of the disposition of the link forks 13, the springs 14 counteract not only the weight of the support segments themselves, but also the weight of the measurement segments. This prevents the measurement segments bending and the reactions on the hinge axes resulting from the force of gravity are taken up by the hinge axes 10, 11, and 12 of the support segments and of the bracket 9.

The springs 14 are preferably designed to balance the weight of the support segments and of the measurement segments so that they remain in the position in which they are placed by a user.

Naturally the invention is not limited to the embodiment described and various embodiments may be made without going beyond the scope of the invention. In particular, although in the embodiment described the support segments are disposed beside the measurement segments so that their hinge axes are colinear, it is also possible to place the support segments above the measurement segments, in which case the hinge axes of the support segments and of the measurement segments are parallel, with the link members 18 being adapted accordingly. For example, the link members may be rings surrounding the measurement segments to support them in any relative orientation of the support segments and the measurement segments relative to the field of gravity forces. In this context, it may also be observed that when the hinge axes are colinear, a single link member 13 between each support segment and the measurement segment it supports suffices to avoid any reaction on the hinge axes of the measurement segments. In other dispositions, in particular when the support segments are disposed above the measurement segments, the measurement segments are caused to slide relative to the link members, and it becomes preferable to provide a plurality of link members between each support segment and the corresponding measurement segment.

Although the apparatus of the invention is described with two measurement segments only, it is naturally possible to provide an apparatus including a larger number of measurement segments, together with the corresponding support segments, thereby providing a larger number of degrees of freedom for the displacements of the end segment which is used for performing measurements.

The assistance springs 14 may also be replaced by other assistance members such as cables associated with counterweights or motors associated with the hinge axes of the support segments and of the bracket 9. It is then possible to couple control of support segment positions with the measurement performed by the measurement segments so as to bring the end measurement segment into a predetermined position automatically or semi-automatically, e.g. so that it presses against a surface. Under such circumstances, the end measurement segment must naturally be fitted with a sensor enabling the movement of the support segments to be stopped as soon as the desired position is reached. In this context, it may be observed that it matters little that the link members 13 are associated with the measurement segments 2 via a degree of play since the link members serve only to compensate for the forces of gravity acting on the measurement segments and they do not participate in any way in taking a measurement per se. The support segments may even be carried by a stand that is quite separate, thereby enabling the measurement apparatus to be used with or without its support segments.

I claim:

1. Apparatus for measuring the shape or position of an object, the apparatus comprising a stand supporting a series of measurement segments hinged to one another and having angular position sensors for sensing the angular positions of the measurement segments, wherein the apparatus further includes a bracket supporting a series of hinged support segments adjacent to the measurement segments, link members fixed to the support segments and engaged at least partially around the measurement segments to support them in a direction opposing the force of gravity, and assistance members acting on the support members to counter the force of gravity.

2. Measurement apparatus according to claim 1, wherein the support segments are hinged about hinge axes that are colinear with the hinge axes of the measurement segments.

3. Measurement apparatus according to claim 1, wherein the stand is fixed on a base plate and the series of measurement segments includes a first measurement segment which is hinged to said stand so as to be pivotable about a first vertical hinge axis, and wherein the bracket has a first end hinged to said base plate about a second vertical hinge axis which is colinear with said first axis, and a second end carrying a first support segment from the series of support segments which is adjacent to said first measurement segment.

* * * * *